US008576045B2

(12) United States Patent
Allen et al.

(10) Patent No.: US 8,576,045 B2
(45) Date of Patent: Nov. 5, 2013

(54) SYNCHRONIZATION OF ELECTRONIC ARTICLE SURVEILLANCE SYSTEMS HAVING METAL DETECTION

(75) Inventors: John A. Allen, Pompano Beach, FL (US); Adam S. Bergman, Boca Raton, FL (US); Manuel A. Soto, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 407 days.

(21) Appl. No.: 12/957,961

(22) Filed: Dec. 1, 2010

(65) Prior Publication Data

US 2012/0092166 A1 Apr. 19, 2012

Related U.S. Application Data

(60) Provisional application No. 61/393,591, filed on Oct. 15, 2010.

(51) Int. Cl.
*G05B 23/02* (2006.01)

(52) U.S. Cl.
USPC ..... 340/3.21; 340/3.2; 340/568.1; 340/572.1; 340/3.41; 340/5.7

(58) Field of Classification Search
USPC ........ 340/540, 541, 568.1, 571, 572.1, 572.4, 340/3.2, 3.21, 3.41, 825.2, 5.7
See application file for complete search history.

(56) References Cited

U.S. PATENT DOCUMENTS 8,264,348 B2 * 9/2012 Dinh ............................ 340/540
8,331,282 B2 * 12/2012 Pandey et al. ................. 370/322
8,351,369 B2 * 1/2013 Han et al. ...................... 370/322
2009/0154481 A1 * 6/2009 Han et al. ...................... 370/406
2010/0001872 A1 * 1/2010 Lian et al. ..................... 340/661
2011/0025498 A1 * 2/2011 Dinh ............................ 340/540

FOREIGN PATENT DOCUMENTS

EP 1857960 A2 11/2007
WO 2008125621 A1 10/2008
WO 2008157113 A2 12/2008
WO 2010005499 A2 1/2010
WO 2010077256 A1 7/2010

OTHER PUBLICATIONS

International Search Report and Written Opinion dated Jul. 5, 2011 for International Application Serial No: PCT/US2010/003208, International Filing Date: Dec. 18, 2010 consisting of 10 pages.

* cited by examiner

*Primary Examiner* — Travis Hunnings
(74) *Attorney, Agent, or Firm* — Alan M. Weisberg; Christopher & Weisberg, P.A.

(57) ABSTRACT

A method and system are provided for minimizing metal detection signal interference by dividing a standard EAS system metal detection burst timeslot into a plurality of timeslots per burst in order to minimize triggering metal detection false alarm signals between adjacent metal detection systems. The method and system include synchronizing a plurality of metal detection systems by generating a signal having a predefined time duration and segmenting the signal into multiple timeslots per signal. A selected timeslot that is assigned to each of the plurality of metal detection systems is stored and the system performs metal detection using the assigned timeslot.

20 Claims, 5 Drawing Sheets

200

SYNCHRONIZATION OF ELECTRONIC ARTICLE SURVEILLANCE SYSTEMS HAVING METAL DETECTION

CROSS-REFERENCE TO RELATED APPLICATION

This application is related to and claims priority to U.S. Provisional Patent Application No. 61/393,591, entitled SYNCHRONIZATION OF ELECTRONIC ARTICLE SURVEILLANCE SYSTEMS HAVING METAL DETECTION, filed on Oct. 15, 2010, the entirety of which is incorporated herein by reference.

STATEMENT REGARDING FEDERALLY SPONSORED RESEARCH OR DEVELOPMENT n/a

FIELD OF THE INVENTION

The present invention relates generally to a method and system for reducing false alarm signals in electronic theft detection systems and more specifically to a method and system for minimizing false alarms by preventing metal detection signal overlap in adjacent combined electronic article surveillance ("EAS") systems and metal detection systems.

BACKGROUND OF THE INVENTION

Electronic Article Surveillance ("EAS") systems are detection systems that allow the detection of markers or tags within a given detection region. EAS systems have many uses. Most often EAS systems are used as security systems to prevent shoplifting from stores or removal of property from office buildings. EAS systems come in many different forms and make use of a number of different technologies.

Typical EAS systems include an electronic detection EAS unit, markers and/or tags, and a detacher or deactivator. The detection unit includes transmitter and receiver antennas and is used to detect any active markers or tags brought within the range of the detection unit. The antenna portions of the detection units can be, for example, bolted to floors as pedestals, buried under floors, mounted on walls, or hung from ceilings. The detection units are usually placed in high traffic areas, such as entrances and exits of stores or office buildings. The deactivators transmit signals used to detect and/or deactivate the tags.

The markers and/or tags have special characteristics and are specifically designed to be affixed to or embedded in merchandise or other objects sought to be protected. When an active marker passes through the detection unit, the alarm is sounded, a light is activated, and/or some other suitable control devices are set into operation indicating the removal of the marker from the proscribed detection region covered by the detection unit.

Most EAS systems operate using the same general principles. The detection unit includes one or more transmitters and receivers. The transmitter sends a signal at defined frequencies across the detection region. For example, in a retail store, placing the transmitter and receiver on opposite sides of a checkout aisle or an exit usually forms the detection region. When a marker enters the region, it creates a disturbance to the signal being sent by the transmitter. For example, the marker may alter the signal sent by the transmitter by using a simple semiconductor junction, a tuned circuit composed of an inductor and capacitor, soft magnetic strips or wires, or vibrating resonators. The marker may also alter the signal by repeating the signal for a period of time after the transmitter terminates the signal transmission. This disturbance caused by the marker is subsequently detected by the receiver through the receipt of a signal having an expected frequency, the receipt of a signal at an expected time, or both. As an alternative to the basic design described above, the receiver and transmitter units, including their respective antennas, can be mounted in a single housing.

Magnetic materials or metal, such as metal shopping carts, placed in proximity to the EAS marker or the transmitter may interfere with the optimal performance of the EAS system. Further, some unscrupulous individuals utilize EAS marker shielding, such as bags lined with metal foil, with the intention to shoplift merchandise without detection by an EAS system. The metal lining of these bags can shield tagged merchandise from the EAS detection system by preventing an interrogation signal from reaching the tags or preventing a reply signal from reaching the EAS system. When a shielded marker passes through the detection unit, the EAS system is not able to detect the marker. As a result, shoplifters are able to remove articles from stores without activating an alarm.

Metal detection systems are used in conjunction with EAS systems to detect the presence of metal objects, such as foil lined bags. The EAS systems and the metal detection systems operate at different energizing frequencies to prevent interference between the systems. For example, the EAS systems and the metal detection systems may use operating frequencies that are separated by 2 kHz.

The metal detection system may use common transmitters and receivers with the EAS system. For metal detection, the transmitter sends a signal across the detection region at a predefined metal detection frequency. When a metal object enters the detection region, it creates a disturbance to the signal being sent by the transmitter. This disturbance caused by the metal object is subsequently detected by the receiver through the receipt of a modified signal. Upon detection of the modified signal, an alarm is sounded, a light is activated, and/or some other suitable control devices are set into operation indicating the presence of metal in a detection region.

EAS/metal detection systems may include a number of metal detectors. Shopping malls or other dense shopping environments may have multiple, separate and independent EAS/metal detection systems in different stores. These EAS/metal detection systems generally operate in an unsynchronized state with respect to the metal detection function.

Conventional metal detection systems generate metal detection signals having a same time duration as the EAS signals. If adjacent unsynchronized metal detection transmission coils are placed in close proximity, the metal detection signal bursts from the adjacent systems may overlap and cause false alarms. What is needed is a system and method that minimizes the occurrence of false alarm signals due to metal detection signal bursts originating from adjacent metal detection system.

SUMMARY OF THE INVENTION

The present invention advantageously provides a method and system for minimizing metal detection signal interference by dividing a standard EAS system metal detection burst timeslot into a plurality of timeslots per burst in order to minimize triggering metal detection false alarm signals between adjacent metal detection systems.

According to one embodiment, a method is provided for synchronizing a plurality of metal detection systems located proximate to each other in order to reduce false alarm signals. The method synchronizes a plurality of metal detection systems by generating a signal having a predefined time duration and segmenting the signal into multiple timeslots per signal. A selected timeslot that is assigned to each of the plurality of metal detection systems is stored and the system performs metal detection using the assigned timeslot.

According to another embodiment, a system is provided for synchronizing a plurality of metal detection systems located proximate to each other in order to reduce false alarm signals. The system includes a memory and a processor that operates to initiate generation of a signal having a predefined time duration. The processor also operates to segment the signal into multiple timeslots per signal. The processor causes the storage device to store a selected timeslot perform metal detection using the assigned timeslot.

According to yet another embodiment, a method is provided of synchronizing a plurality of metal detection systems located proximate to each other in order to reduce false alarm signals. The method synchronizes a plurality of metal detection systems by generating a plurality of signals having a corresponding timeslot with a predefined time duration and synchronizing the plurality of signals at a crossing point. The plurality of signals is segmented into selected timeslots. A selected timeslot that is assigned to each of the plurality of metal detection systems is stored and used to perform metal detection using the assigned timeslot.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
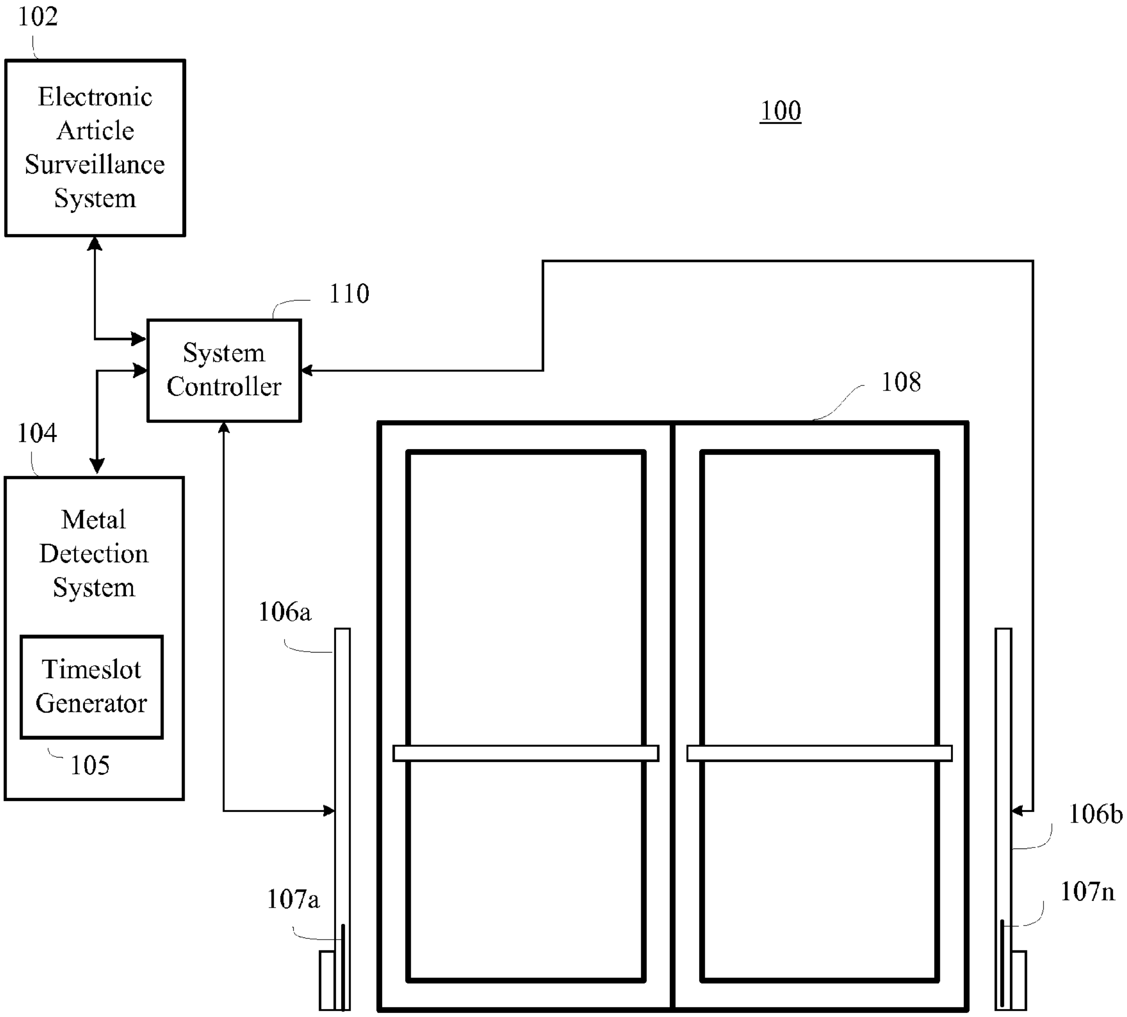
FIG. 1 is a block diagram of an exemplary security system having an EAS detection and synchronized metal detection capabilities constructed in accordance with the principles of the invention.

Before describing in detail exemplary embodiments that are in accordance with the invention, it is noted that the embodiments reside primarily in combinations of apparatus components and processing steps for performing metal detection using an electronic article surveillance ("EAS") system.

The system and method components are represented by conventional symbols in the drawings, where appropriate. The drawings show only those specific details that are pertinent to understanding the embodiments of the invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for minimizing metal detection signal interference by dividing a standard EAS system metal detection burst timeslot into a plurality of timeslots per burst in order to minimize triggering metal detection false alarm signals between adjacent metal detection systems.

The EAS systems detect markers that pass through a predefined detection area (also referred to as an interrogation zone). The markers may include strips of melt-cast amorphous magnetic ribbon, among other marker types. Under specific magnetic bias conditions, the markers receive and store energy, such as acousto-magnetic field energy, at their natural resonance frequency. When a transmitted energy source is turned off, the markers become signal sources and radiate the energy, such as acousto-magnetic ("AM") energy, at their resonant frequency. The EAS system is configured to detect the AM energy transmitted by the markers, among other energy.

One embodiment of the present invention combines marker (e.g., tag) detection system with metal detection by advantageously providing a method and system for detecting the presence of metal in an interrogation zone of a security system and determining whether the detected metal is an EAS marker shield, such as a foil-lined bag. The security system combines traditional EAS detection capabilities with metal detection to improve the accuracy of the system, thereby reducing the likelihood of false alarms.

Referring now to the drawing figures where like reference designators refer to like elements, there is shown in FIG. 1 a security system constructed in accordance with the principles of the invention and designated generally "100." The security system 100 may be located at a facility entrance, among other locations. The security system 100 may include an EAS system 102, a metal detection system 104, and a pair of pedestals 106*a*, 106*b* (collectively referenced as pedestals 106) on opposing sides of an entrance 108, for example. The metal detection system may include a timeslot generator 105 that divides a conventional metal detection signal into a plurality of separate timeslots.

One or more antennas 107*a*, 107*n* (collectively referenced as antennas 107) may be included in the pedestals 106 that are positioned a known distance apart. The antennas 107 may be used by the EAS system 102 and the metal detection system 104, among other systems. A system controller 110 is provided to control the operation of the security system 100 and is electrically coupled to the EAS system 102, the metal detection system 104, and the antennas 107, among other components. One of ordinary skill in the art will appreciate that while the timeslot generator 105 is shown in FIG. 1 as being a part of the metal detection system 104, it is contemplated that the timeslot generator 105 may be separate or included in other elements of the system 100, e.g., as part of the system controller 110.

Also, although the EAS system 102, the metal detection system 104 and the system controller 110 are shown as separate elements, such presentation is for ease of understanding and is not intended to limit the scope of the invention. It is contemplated that the EAS system 102, the metal detection system 104 and the system controller 110 may be incorporated in fewer than three physical housings. It is also understood that the EAS system 102, the metal detector system 104 and/or the system controller 110 can share or have separate CPUs, memory, volatile/non-volatile storage and communication interfaces and can execute programmatic software stored in the memory and storage devices to perform the functions described herein. Timeslot generator 105 may be implemented as hardware, executable programmatic software with metal detection system 104 or a combination thereof.

According to one embodiment, the EAS system 102 applies a transmission burst and listening arrangement to detect objects, such as markers. The detection cycle may be 90 Hz (11.1 msec), among other detection cycles. The detection cycle may include, for example, four time periods that include a transmission window, a tag detection window, a synchronization window and a noise window. The transmission window may be defined as time period "A." During time period A, the EAS system 102 may transmit a 1.6-millisecond burst of the AM field at 58 kHz, to energize and interrogate markers that are within range of the transmitter and resonate at the same frequency. The markers may receive and store a sufficient amount of energy to become energy/signal sources. Once charged, the markers may produce an AM field at 58 kHz until the energy store gradually dissipates in a process known as ring down.

The tag detection window may be defined as time period "B." The tag detection window may follow in time directly after the transmission window and may continue for 3.9 milliseconds (to 5.5 milliseconds). During time period B, the markers transmit signals while the system is idle (e.g., while the system is not transmitting signals). Time period B is defined by a quiet background level since the EAS system 102 is not transmitting signals. Typically, the AM field signal level for the EAS system 102 is several orders of magnitude larger that the AM field signal level for the marker. Without the EAS system 102 transmitting the AM field signal, the receiver is more easily able to detect signals emanating from the markers.

The synchronization window may be defined as time period "C." The synchronization window may follow in time directly after the tag detection window and may continue for 1.6 milliseconds (to 7.1 milliseconds). The synchronization window allows the signal environment to stabilize after the tag detection window. Additionally, the noise window may be defined as time period "D." The noise window may follow in time directly after the synchronization window and may continue for 4.0 milliseconds (to 11.1 milliseconds). During the noise window, the communication environment is expected to be devoid of interrogation and response signals so that the noise component of the communication environment may be measured. The noise window allows the receiver additional time to listen for the tag signals. The energy in the marker may be fully dissipated during time period D, so the receiver may not detect AM signals emanating from the markers. Any AM signals detected during this time period may be attributed to unknown interference sources. For this reason, the alarm trigger signal may be disabled during time period D.

According to one embodiment, a metal detection system 104 is provided and may share hardware components with the EAS system 102. Accordingly, the metal detection system 104 may share antennas 107 with the EAS system 102. For example, the antennas 107 may be employed as transmitting antennas for both the EAS system 102 and the metal detection system 104. The metal detection system 104 may monitor the signal for induced eddy currents that indicate the presence of metal objects positioned proximate to the antennas 107. Typically, for good conductors, the induced eddy currents dissipate in approximately tens of microseconds. By comparison, eddy currents dissipate approximately two orders of magnitude faster than the AM energy for acoustic markers.

The EAS system 102 and the metal detection system 104 may be designed to operate at different frequencies. For example, the EAS system 102 may operate at 58 kHz, while the metal detection system 104 may operate at 56 kHz. One of ordinary skill in the art will readily appreciate that these systems may operate at other frequencies.

The metal detection system 104 detects metal within the EAS detection zone by concurrently in time transmitting a signal and measuring a return signal. According to one embodiment, the signal may be transmitted on a transmitting coil and received on a receiving coil, wherein the receiving coil may be located adjacent to the transmitting coil. When metal objects are positioned within the detection zone, the metal detection system 104 may trigger an alarm signal if the receiving coil detects a change in the magnetic field signal. Alternatively, a first metal detection system may generate a false alarm signal upon detecting stray magnetic field signals generated by a second adjacent metal detection system positioned proximate to the first metal detection system.

For example, a transmitting coil associated with the second metal detection system positioned adjacent to the first metal detection system may generate a burst signal that overlaps a burst signal generated by the transmitting coil of the first metal detection system. Under these circumstances, the first metal detection system may generate a false alarm signal upon detecting the burst signal that originates from the second metal detection system. According to one embodiment, neighboring metal detection systems located approximately 35 feet or less from each other have a high probability of inducing or generating false alarm signals due to burst signals originating or received from an adjacent system.

Figure 2:
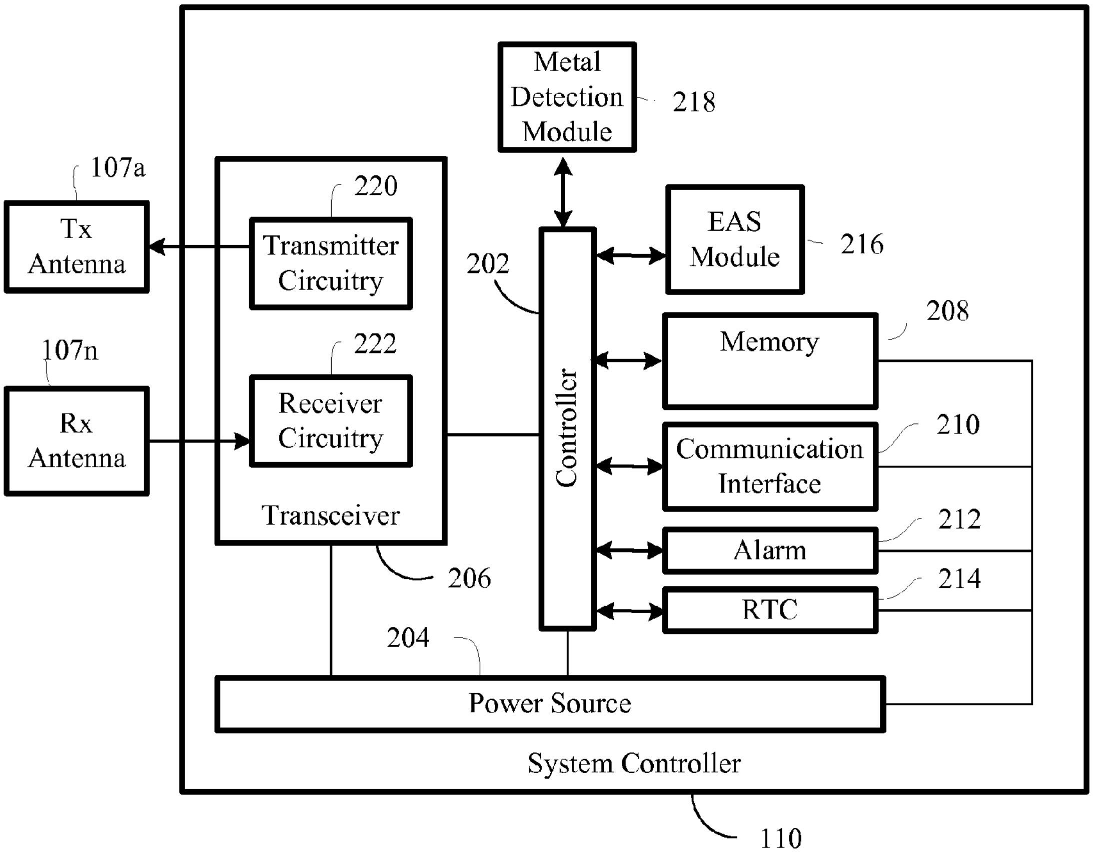
FIG. 2 is a block diagram of an exemplary EAS detection and metal detection system controller constructed in accordance with the principles of the present invention.

FIG. 2 illustrates exemplary EAS detection and metal detection device 200 for implementing the security system 100. The EAS detection and metal detection device 200 may include a system controller 110 having several components. For example, the system controller 110 may include a controller 202, such as a processor or a microprocessor; a power source 204; a transceiver 206; a memory 208, such as a non-volatile memory, volatile memory, or a combination thereof; a communication interface 210; an alarm 212; a real-time clock ("RTC") 214; an EAS module 216; and a metal detection module 218; among other components.

The controller 202 may implement several functions performed by the EAS detection and metal detection device 200, including coordinating radio communications, storing data to the memory 208, coordinating data communications, and activating the alarm 212, among implementing other functions. The power source 204 may include a DC power source and/or an AC power source that supplies power to the EAS detection and metal detection device 200. The alarm 212 may include software components and hardware components that generate a visual and/or audible alert in response to detecting an EAS marker and/or a metal object positioned within an interrogation zone of the security system 100.

The transceiver 206 may include a transmitter 220 that is electrically or electromagnetically coupled to one or more transmitting antennas 107*a*. The transceiver 206 also may include a receiver 222 that is electrically or electromagnetically coupled to one or more receiving antennas 107*n*. According to an alternate embodiment, a single antenna or pair of antennas may be used as both the transmitting antenna 107*a* and the receiving antenna 107*n*. The transmitter 220 may transmit a radio frequency ("RF") signal using the transmit antenna 107*a* to "energize" an EAS marker located proximate to the interrogation zone of the security system 100.

Additionally, the transmitter 220 may transmit a metal detection signal using the transmit antenna 107*a* to detect metal within range of the interrogation zone of the security system 100. The receiver 222 may detect a response signal from the EAS marker or a metal object using the receive antenna 107*n*.

The memory 208 is provided to directly or indirectly interact with components of the system controller 110 and/or external devices. The memory 208 may be configured to store and retrieve data and information that is communicated to, from and within the system controller 110. The communication interface 210 is provided to facilitate communications with the system controller 110.

A real-time clock ("RTC") 214 may be provided that is electrically coupled to the controller 202. The RTC 214 may include a timer that communicates with the controller 202 to enable the controller 202 to associate time data with the occurrence of an event. An event occurrence may include initiating a metal detection signal, an EAS detection signal and/or a false alarm signal, among other event occurrences. The controller 202 may create a time stamp to enable event logging, including logging alarm events, among other events.

The EAS module 216 communicates with the EAS system 102 to apply a transmission burst and detect the presence of tags within the interrogation zone. The metal detection module 218 communicates with the metal detection system 104 to detect the presence of metal within the EAS detection zone. According to one embodiment, the metal detection system 104 transmits a signal and measures a return signal concurrently in time over a standard 1.6 ms EAS system metal detection burst. The signal may be transmitted on a transmitting coil and received on a receiving coil, wherein the receiving coil may be located adjacent to the transmitting coil. According to one embodiment, the metal detection system 104 communicates with the metal detection module 218 to segment the standard 1.6 ms EAS system metal detection burst into multiple timeslots per burst. The segmented metal detection burst enables adjacent metal detection systems 104 to operate in close proximity, while minimizing false alarms due to detecting metal detection bursts from the adjacent metal detection systems 104.

Figure 3:
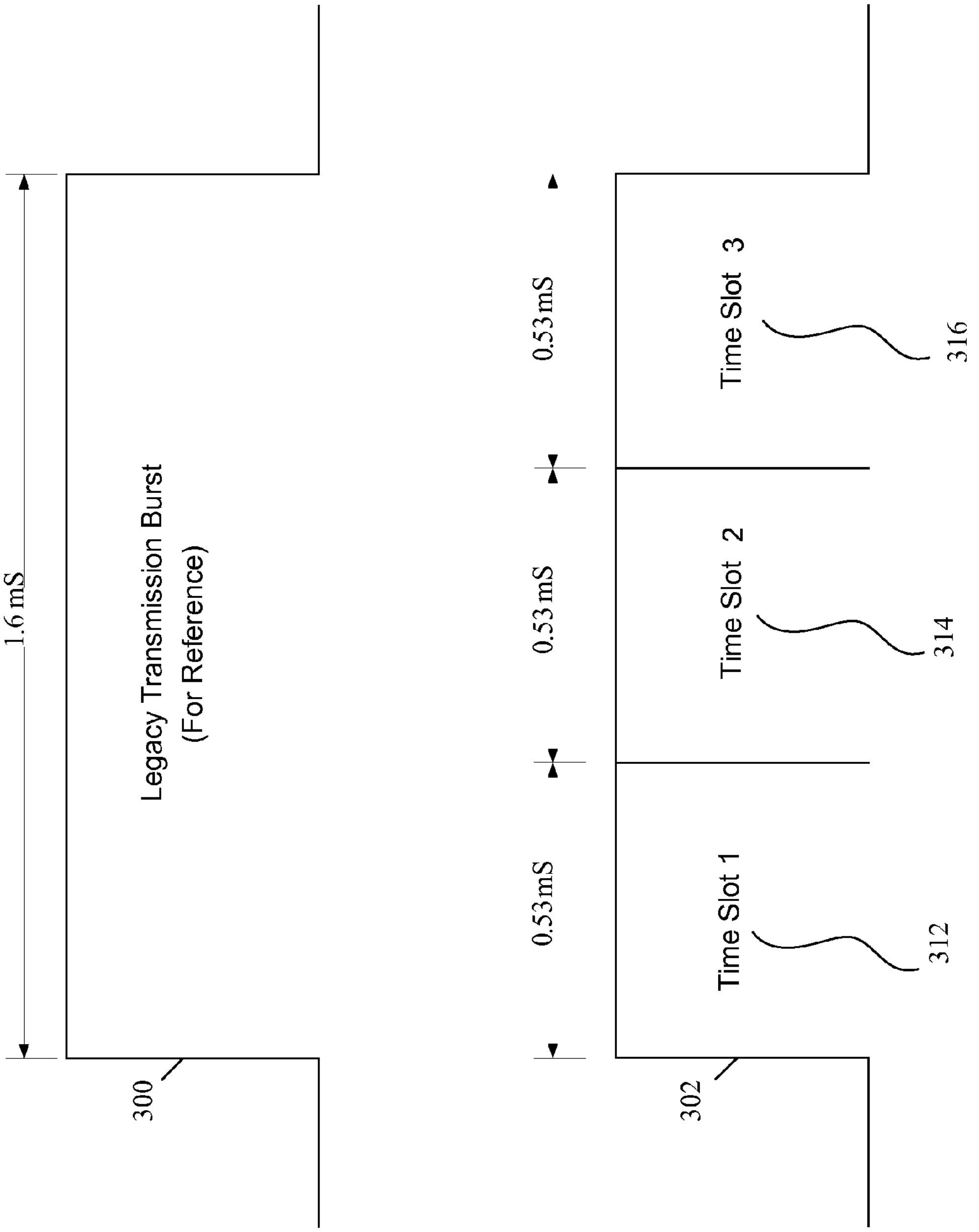
FIG. 3 is a waveform schematic diagram illustrating a standard timeslot for the EAS system and a divided timeslot for the metal detection system.

FIG. 3 illustrates a waveform schematic diagram of a standard 1.6 ms EAS system metal detection burst that is segmented into multiple timeslots per burst by the metal detection system 104 in coordination with the metal detection module 218. The exemplary waveform signal 300 has a 1.6 ms duration. The waveform signal 300 is generated during a time period when no interference is detected between the EAS system 102 and the metal detection system 104. The waveform signal 300 is a digital signal that may be generated by a microprocessor within the metal detection system 104. As illustrated by waveform signal 302, the waveform signal 300 may be divided in a plurality of time slots having a duration that is less than 1.6 ms. For example, waveform signal 302 may include a first time slot 312 having a duration of 0.53 ms, a second time slot 314 having a duration of 0.53 ms and a third time slot 316 having a duration of 0.53 ms. One of ordinary skill in the art will readily appreciate that waveform signal 302 may be divided into a greater or lesser number of time slots.

Figure 4:
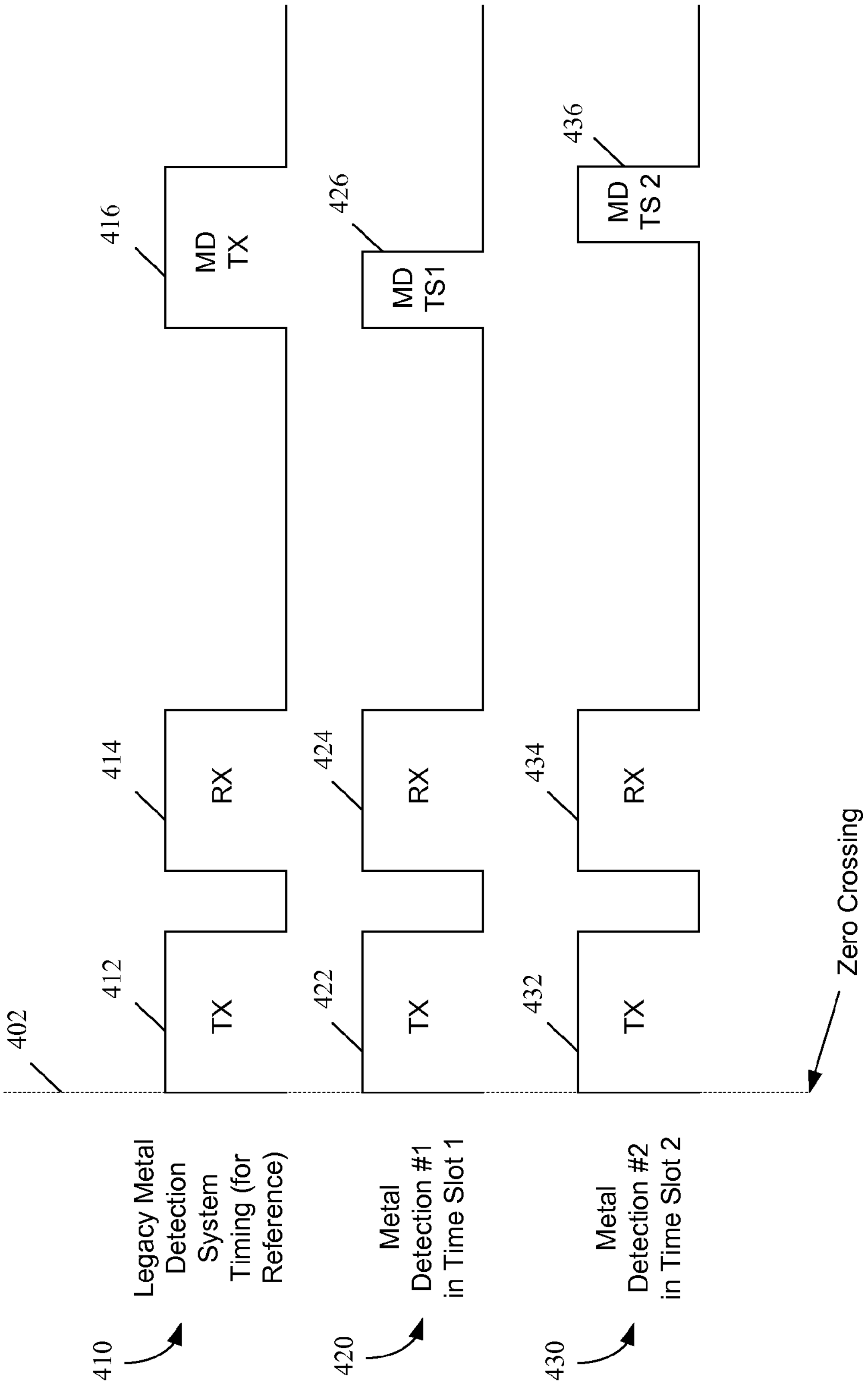
FIG. 4 is a waveform schematic diagram illustrating a legacy metal detector system and two metal detector systems in accordance with principles of the invention.

FIG. 4 illustrates a plurality of waveforms 410, 420, 430 that are synchronized at a waveform crossing point 402. Such a waveform crossing point 402 can be, for example, the zero crossing point of the line power signal or a timing reference such as a GPS, among other waveform crossing points. A standard exemplary metal detection system waveform 410 is shown to include a first transmission burst window 412 for the EAS system and a receiving window 414 for the EAS system. The typical standard metal detection system waveform 410 also includes a metal detection burst window 416 having approximately a same time duration as the first transmission burst window 412 for the EAS system and the receiving window 414 for the EAS system.

FIG. 4 further illustrates a first metal detection system waveform 420 in accordance with the present invention that includes a first transmission burst window 422 for the EAS system and a receiving window 424 for the EAS system. The first metal detection system waveform 420 includes a first metal detection burst window 426 having a time duration that is approximately half of the time duration of the first transmission burst window 422 for the EAS system and the receiving window 424 for the EAS system.

FIG. 4 still further illustrates a second metal detection system waveform 430 that includes a first transmission burst window 432 for the EAS system and a receiving window 434 for the EAS system. The second metal detection system waveform 430 includes a second metal detection burst window 436 having a time duration that is approximately half of the time duration of the first transmission burst window 432 for the EAS system and the receiving window 434 for the EAS system. As a result of the reduced signal duration of the first metal detection burst window 426 and the second metal detection burst window 436, there is a reduced opportunity for signal overlap between the metal detection burst window 426 and the metal detection burst window 436. In other words, the metal detection burst window 426 of the first metal detection system is less likely to interfere with, or be interfered by, the metal detection burst window 436 of the second metal detection system and vice versa.

As illustrated in FIG. 4, the metal detection module 218 may divide the standard EAS system metal detection burst signal 416 into multiple timeslots per burst. According to one embodiment, a field installer may access the metal detection module 218 at the point of manufacturer or at the deployment location to configure the number of timeslots per burst. While FIG. 4 shows that the metal detection module 218 may divide the standard metal detection timeslot into two timeslots, the invention is not limited to such configuration. One of ordinary skill in the art will readily appreciate that the metal detection module 218 may be programmed to divide a metal detection timeslot into any number of timeslots. As a result, metal detection modules 218 of the present invention may be configured to enable several metal detectors to operate in close proximity to each other and in unison, without interfering with each other due to proximity of location.

According to one embodiment, the metal detection module 218 includes configurable parameters that enable users to establish a plurality of metal detection timeslots per standard metal detection burst timeslot signal. According to one embodiment of the invention, the metal detection module 218 enables users to select which metal detection timeslot each system will use for metal detection. Furthermore, the metal detection module 218 enables field installation personnel to configure the metal detection burst period time slots to enable testing and fine tuning of the system performance by determining which time slot offers the best performance. The reduced time duration for metal detection associated with the plurality of timeslots provides additional benefits of consuming less power compared to existing systems that use standard duration metal detection timeslot signals for metal detection.

Figure 5:
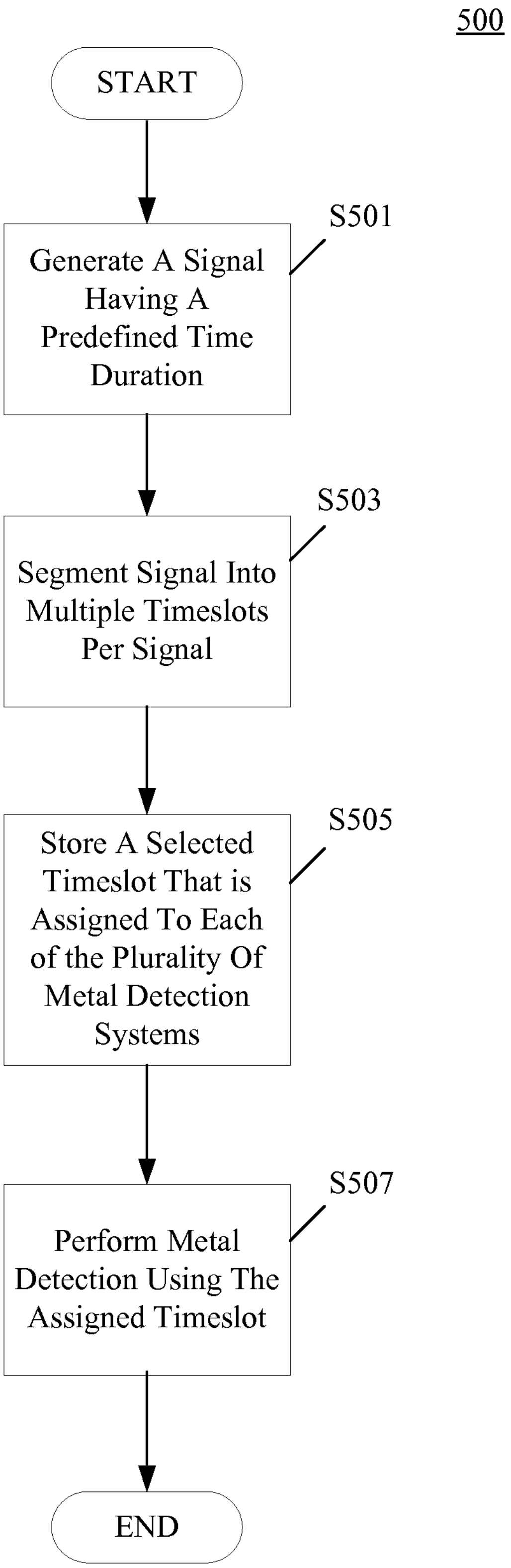
FIG. 5 is a flowchart of an exemplary metal detection synchronization process according to the principles of the present invention.

FIG. 5 is a flowchart of an exemplary metal detection synchronization process 500 according to the principles of the present invention. According to one embodiment, a method of synchronizing the plurality of metal detection systems includes generating a signal having a predefined time duration (step S501). The signal is segmented into multiple timeslots per signal (step S503) and a timeslot that is selected and assigned to each of the plurality of metal detection systems is stored (step S505). The EAS/metal detection system 200 performs metal detection using the assigned timeslot (step S507).

The invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of synchronizing metal detection among a plurality of electronic article surveillance (EAS)/metal detection systems by using segmented metal detection burst windows, each metal detection burst window being segmented into multiple timeslots, the method comprising:

receiving an assignment to one of the multiple timeslots;

storing the assigned timeslot; and synchronizing metal detection by performing metal detection within the assigned timeslot.

2. The method according to claim 1, wherein the metal detection burst window has a duration substantially equal to a duration of an EAS burst window.

3. The method according to claim 2, wherein the metal detection burst window is substantially 1.6 ms in duration, the multiple timeslots each are a duration of less than substantially 1.6 ms.

4. The method according to claim 1, further comprising synchronizing an EAS burst window, EAS receiving window and metal detection burst window of each one of the plurality of EAS/metal detection systems based on a zero crossing point.

5. The method according to claim 1, wherein each EAS/metal detection system is assigned a different timeslot.

6. The method according to claim 1, wherein the number of timeslots in each metal detection window is based on a user selection.

7. The method according to claim 1, wherein the number of timeslots in each metal detection window is based on a number of EAS/metal detection systems to be synchronized.

8. An electronic article surveillance (EAS)/metal detection system having metal detection that is synchronized with metal detection of at least one other EAS/metal detection system by using segmented metal detection burst windows, each metal detection burst window being segmented into multiple timeslots, the system comprising:

a memory; and a processor configured to:

receive an assignment of one of the multiple timeslots;

cause the memory to store the assigned timeslot; and perform metal detection within the assigned timeslot.

9. The system according to claim 8, wherein the metal detection burst window has a duration substantially equal to a duration of an EAS burst window.

10. The system according to claim 9, wherein the metal detection burst window is 1.6 ms in duration.

11. The system according to claim 10, the multiple timeslots each are a duration of less than substantially 1.6 ms.

12. The system according to claim 8, wherein the processor is further configured to select a number of timeslots to segment the metal detection burst window into multiple timeslots.

13. The system according to claim 12, wherein the processor is further configured to enable a user to manually select the number of timeslots.

14. The system according to claim 12, wherein the processor selects the number of timeslots based on a number of metal detection systems to be synchronized.

15. A method of synchronizing metal detection in a plurality of electronic article surveillance (EAS)/metal detection systems by using segmented metal detection burst windows, the method comprising:

synchronizing an EAS burst window, an EAS receive window and a metal detection burst window of each EAS/metal detection system based on a signal crossing point, each metal detection burst window being segmented into multiple timeslots, each one of the plurality of EAS/metal detection systems being assigned a respective one of the multiple time slots;

storing, at each EAS/metal detection system, the corresponding assigned timeslot; and synchronizing metal detection among the plurality of EAS/metal detection systems by performing metal detection, at each EAS/metal detection system, within the corresponding assigned timeslot.

16. The method according to claim 15, wherein synchronizing the EAS burst window of each EAS/metal detection system at the crossing point includes synchronizing based on at least one of a line power signal and a timing reference.

17. The method according to claim 15, wherein the metal detection burst window has a duration substantially equal to a duration of EAS burst window.

18. The method according to claim 16, wherein the metal detection burst window is substantially 1.6 ms in duration.

19. The method according to claim 17, wherein each of the multiple timeslots are less than substantially 1.6 ms in duration.

20. The method according to claim 15, wherein the number of timeslots in each metal detection window is based on a number of EAS/metal detection systems to be synchronized.

* * * * *